(12) United States Patent
Pujol

(10) Patent No.: US 9,637,235 B2
(45) Date of Patent: May 2, 2017

(54) METHOD FOR MONITORING AND LOCKING AIRCRAFT COMPARTMENT DOORS

(75) Inventor: Olivier Pujol, Montaigut sur Save (FR)

(73) Assignee: AIRBUS, Blagnac (FR)

( * ) Notice: Subject to any disclaimer, the term of this patent is extended or adjusted under 35 U.S.C. 154(b) by 193 days.

(21) Appl. No.: 13/126,923

(22) PCT Filed: Oct. 27, 2009

(86) PCT No.: PCT/FR2009/052067
§ 371 (c)(1),
(2), (4) Date: Aug. 2, 2011

(87) PCT Pub. No.: WO2010/049641
PCT Pub. Date: May 6, 2010

(65) Prior Publication Data
US 2011/0273269 A1 Nov. 10, 2011

(30) Foreign Application Priority Data
Oct. 30, 2008 (FR) ...................................... 08 57401

(51) Int. Cl.
*G08B 5/22* (2006.01)
*B64D 11/00* (2006.01)
*B64C 1/14* (2006.01)
*B64D 45/00* (2006.01)
*G07C 9/00* (2006.01)

(52) U.S. Cl.
CPC .......... *B64D 11/003* (2013.01); *B64C 1/1407* (2013.01); *B64D 45/0015* (2013.01); *G07C 9/00166* (2013.01); *G07C 9/00571* (2013.01); *G07C 9/00896* (2013.01)

(58) Field of Classification Search
CPC .. B64C 1/1407; B64D 11/003; B64D 45/0015
USPC ..................... 340/5.73, 6.1, 12.5; 244/118.1; 455/414.1
See application file for complete search history.

(56) References Cited

U.S. PATENT DOCUMENTS

| 5,243,323 | A | * | 9/1993 | Rogers | ........................... 340/433 |
| 6,307,475 | B1 | * | 10/2001 | Kelley | .................... G01S 13/56 |
| | | | | | 340/506 |
| 6,454,210 | B1 | * | 9/2002 | Plattner | ...................... 244/129.5 |
| 7,249,737 | B2 | * | 7/2007 | Simmons et al. | ......... 244/129.5 |

(Continued)

FOREIGN PATENT DOCUMENTS

EP 1 767 732 3/2007

OTHER PUBLICATIONS

International Search Report issued Jan. 28, 2010 in PCT/FR09/52067 filed Oct. 29, 2009.

*Primary Examiner* — Hai Phan
*Assistant Examiner* — Royit Yu
(74) *Attorney, Agent, or Firm* — Oblon, McClelland, Maier & Neustadt, L.L.P.

(57) ABSTRACT

The invention relates to a system for monitoring and locking aircraft compartment doors (1, 2, 3, 4), characterized in that said system includes a centralized device (12) for controlling the locking/unlocking in the form of a central processing unit (12) for controlling remote bolt devices having a radio transceiver device and a plurality of remote bolt devices (6) for locking/unlocking said doors provided with a radio control device connected to the transceiver device of the control device.

17 Claims, 2 Drawing Sheets

(56) References Cited

U.S. PATENT DOCUMENTS

Figure 1:
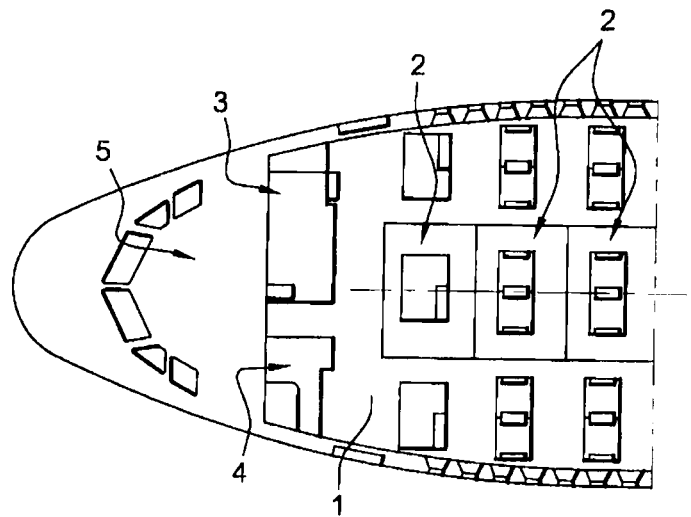

| | | | |
|---|---|---|---|
| 7,690,156 B2* | 4/2010 | Imai et al. | 49/360 |
| 8,174,837 B2* | 5/2012 | Tracy et al. | 361/747 |
| 2002/0035515 A1* | 3/2002 | Moreno | A47G 29/141 |
| | | | 340/5.73 |
| 2002/0142831 A1* | 10/2002 | Mattice et al. | 463/29 |
| 2002/0172095 A1* | 11/2002 | Pandipati | 368/47 |
| 2003/0006879 A1* | 1/2003 | Kang et al. | 340/5.61 |
| 2003/0024754 A1* | 2/2003 | Konno et al. | 180/287 |
| 2003/0058112 A1* | 3/2003 | Gleine | 340/573.1 |
| 2003/0121301 A1* | 7/2003 | Warmack | 70/257 |
| 2004/0089766 A1* | 5/2004 | Semprini | 244/118.5 |
| 2004/0222645 A1* | 11/2004 | Pirone et al. | 292/251.5 |
| 2005/0006528 A1* | 1/2005 | Movsesian et al. | 244/129.5 |
| 2005/0082429 A1* | 4/2005 | D'Alvia | 244/118.5 |
| 2005/0212656 A1* | 9/2005 | Denison et al. | 340/5.73 |
| 2005/0253020 A1* | 11/2005 | McCoskey et al. | 244/137.1 |
| 2006/0044124 A1* | 3/2006 | Hofbeck et al. | 340/438 |
| 2007/0056338 A1 | 3/2007 | Sabo et al. | |
| 2007/0252038 A1* | 11/2007 | Santiago Alvarez | 244/118.1 |
| 2007/0257772 A1 | 11/2007 | Marcelle et al. | |
| 2008/0078869 A1* | 4/2008 | Kneller et al. | 244/118.5 |
| 2008/0078871 A1 | 4/2008 | Munson et al. | |
| 2008/0150319 A1* | 6/2008 | Ray | 296/146.1 |
| 2008/0316007 A1* | 12/2008 | Brinton et al. | 340/425.5 |
| 2010/0002082 A1* | 1/2010 | Buehler | G08B 13/19693 |
| | | | 348/159 |
| 2010/0253469 A1* | 10/2010 | Ray | 340/5.1 |

* cited by examiner

METHOD FOR MONITORING AND LOCKING AIRCRAFT COMPARTMENT DOORS

The present invention relates to a system for monitoring and locking the doors of the compartments of an aircraft.

Aircraft on-board security is afforded by a certain number of measures and devices such as reinforced cockpit doors and video surveillance.

Likewise, safety measures for protecting the airplane on the ground are also in force.

The airlines notably have rules with which they must comply before they can board passengers.

They must in particular make sure, at the time of the first flight out in the morning, that there is no suspect package in the luggage lockers or in other areas of the airplane such as the toilets, the cabin crew rest areas and, more generally, areas or compartments in which objects may be concealed.

This is a daily operational requirement which is costly in terms of time and which forces the cabin crew to make a full sweep of the airplane in order to check the security thereof.

At the behest of the official authorities such as the DGAC in France, the FAA in the USA and other regulatory bodies, the airlines are obliged to ensure that the airplanes do not present any on-board threat when they start boarding the passengers.

That means that the airplane has to be protected overnight, for example by means of "chipping" the hatches and exterior doors. That also means that when they start boarding passengers, once the providers servicing the aircraft have completed their tasks, the cabin crew has to make a security sweep of the cabin.

This sweep involves checking in certain compartments of the airplane that no suspect package has been left.

These compartments are mainly the luggage lockers all along the cabin, the toilets and certain compartments in the toilets, and the rest areas.

The method for performing the security sweep in the morning before the first flight of the day is fairly simple: all of the interior doors or hatches are opened and the crew makes a visual check that no object is present in that area.

If an object is discovered, it is treated as a suspect package with all the ensuing consequences.

Likewise, the last crew to leave the airplane in the evening once again makes a full sweep of the cabin to check that no passenger has left any luggage in any of the aforementioned compartments.

For the airlines, the security sweep represents a relatively high burden because it is costly in terms of time.

In jumbo jets seating between 500 and 800 people, a full search represents a significant down-time.

In addition, if a suspect package is discovered, the associated protocol is relatively involved and may even cause the airplane to be delayed, which costs the airline dearly.

Now, the airlines are seeking to minimize the time spent preparing the airplane because having the airplane immobilized on the apron costs them dearly.

The object of the invention is to propose a system that makes it possible appreciably to reduce or even to eliminate the security sweep.

The principle underlying the invention involves replacing a security sweep prior to use of the airplane with a proposed central locking of all the areas that an individual with ill intent could visit as the crew leaves the airplane.

To do that, the present invention provides a system for monitoring and for locking the doors of compartments of an aircraft which comprises a central locking/unlocking control device in the form of a central control computer that operates remote locking devices equipped with a radiofrequency emitter/receiver device and a plurality of remote locking devices for locking/unlocking said doors or hatch which are provided with a radiofrequency control device connected with the emitter/receiver device of the control device.

Advantageously, the remote locking devices comprise a magnetic lock and comprise an electromagnetic control device.

According to one advantageous embodiment, the connection between the central control device and the remote locking devices is a connection of the WiFi type.

For preference, the remote locking devices are provided with electrical power supplies which are at least partially autonomous.

According to one particular embodiment, the central computer is a cabin computer.

According to one particularly advantageous embodiment of the invention, the remote locking devices comprise means of detecting faults or forced entry and of transmitting corresponding error messages, the central control device comprising means of receiving, decoding and displaying these messages.

The central computer more particularly comprises a means for controlling the opening/closing of all of the remote locks.

The invention also provides a method of monitoring an aircraft, characterized in that prior to a period of non-use of the aircraft, the security of a plurality of spaces within the aircraft is checked and the doors and/or hatches providing access to these spaces are closed, the plurality of locks of said doors and/or hatches is centrally locked by means of a monitoring and locking system according to the invention, in that prior to a further period of use of the aircraft, the status of said locks is checked using said monitoring and locking system.

Advantageously, according to the method of the invention, the status of said locks is checked in the central computer of the system and if it is detected that at least one lock has been forced, a security check is made at least at the space sealed by the door and/or hatch equipped with said lock.

More particularly, the method is such that once the status of said locks has been checked, the plurality of locks is opened by means of a central control from the central computer.

Figure 2:
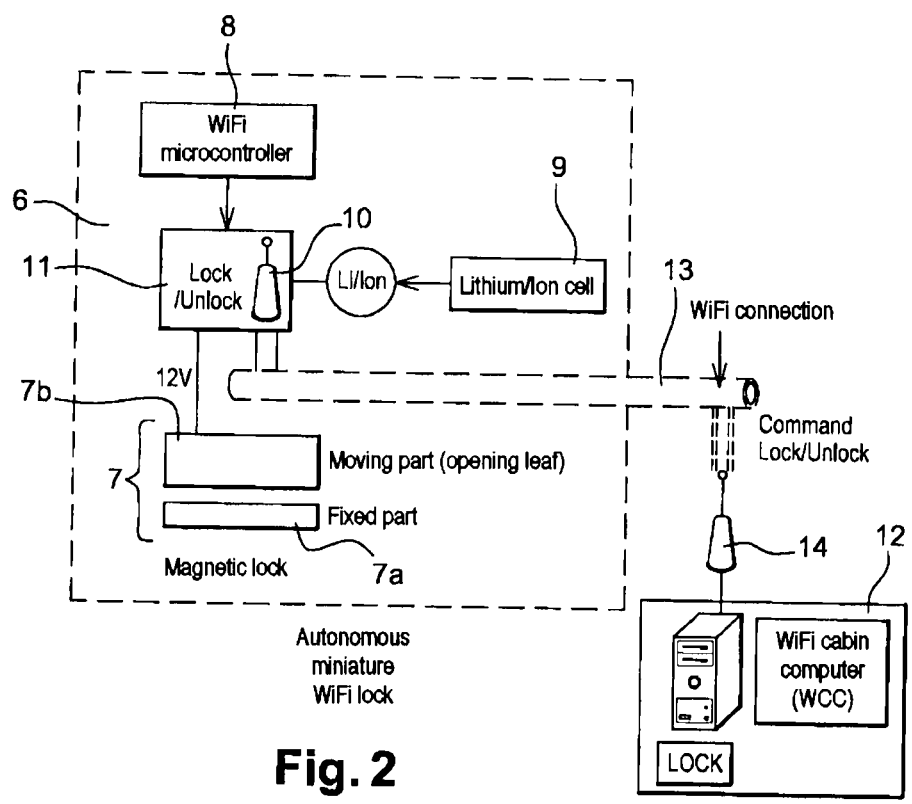
Figure 3:
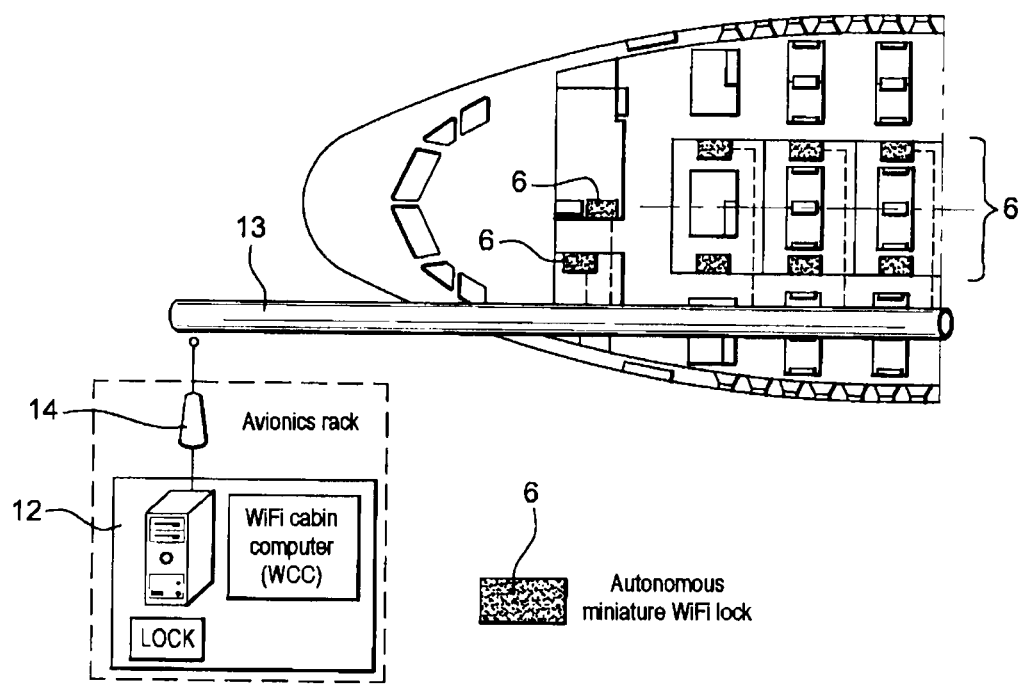

Other features and advantages of the invention will be better understood from reading the description which follows of one nonlimiting exemplary embodiment of the invention made with reference to the drawings which depict:

in FIG. 1: a plan view of part of an aircraft cabin;

in FIG. 2: a schematic view of a locking device and of a computer of the invention;

in FIG. 3: the view of FIG. 1 with a system according to the invention implanted within it.

FIG. 1 depicts a view of part of an aircraft cabin 1 grouping together examples of areas that need to be checked.

The areas depicted are the luggage lockers 2, the crew rest area 3, the toilets 4 and, more generally, any accessible compartment of the aircraft.

This partial view of the cabin already reveals that, in a space that is small in comparison with the whole aircraft cabin, there are a great many areas, compartments or spaces, all closed by doors, and that have to be checked.

When the check has been made, the doors providing access to these compartments are locked.

The term door is to be understood here in its broadest sense and to encompass any type of door that can be fitted with a lock: a locker lid, door, hatch or the like.

FIG. 2 depicts a schematic view of an autonomous locking device 6 remote from a control system.

This is a miniaturized device comprising the following:
a miniature magnetic lock 7 made up of a fixed part 7a comprising a permanent magnet and a moving part 7b that is magnetized when powered by a current. The moving part may, for example, comprise a coil around a ferrite rod.

The magnetic lock is controlled by a microcontroller 8 and the entire assembly is powered by an electrical power supply device 9 such as an Li/Ion cell or by a battery that can be recharged on the cabin accessories power supply circuit.

The electrical power supply device supplies the microcontroller and the lock with the power they need in order to operate.

The microcontroller comprises means of managing a wireless connection such as a medium range wireless digital connection of the WiFi type and is connected to an antenna 10.

The magnetic lock is controlled through the microcontroller by an electronic switch 11.

The autonomous remote locking device 6 is connected by the WiFi wireless connection to a WiFi central computer which in the example is a WiFi cabin computer (WCC) 12 via radio waves transmitted through the cabin which has been depicted schematically in the form of a tube drawn in dotted line but which could also be a computer in the electronics compartment with a control interface in the cabin.

The WiFi central computer sends out the LOCK/UNLOCK control commands that close/open the locks via an antenna 14.

The miniature autonomous lock can also send a fault message over the WiFi network. For example, a lock which has been forced automatically sends a fault message to the WCC.

The latter comprises means for decoding and displaying these messages in order to allow the crew or a safety or maintenance team to become aware of the problem and take the appropriate actions.

Locking for example corresponds to a supply of power to the magnetic lock and unlocking corresponds to the power supply to this lock being cut off.

The WCC is a simple computer which has a control in the form of a button defining two positions of all of the locking devices: LOCK and UNLOCK.

The main advantage of the WiFi connection is that it makes it easier for the locking devices to be installed as these require no wired connection when powered by a cell, in the case of a completely autonomous power supply, or have only an electrical power supply connection if they comprise a rechargeable battery which allows autonomous power supply when the aircraft energy generation facility is switched off, this corresponding to an at least partially autonomous power supply.

In addition, most future aircraft will be equipped with WiFi technology, and so WiFi locking devices will be able to make use of the network that will already exist, it being possible for the function of locking/unlocking the locks to be incorporated into a cabin computer that controls other functions.

The advantage of having an energy cell by way of a power supply is that it avoids direct connections to the airplane electricity generation facility, as doing so would entail the addition of power supply cables.

In any event, because the aircraft electricity generation facility is not in operation during periods of non-use of the airplane, the locking devices have to have an autonomous source of energy during these periods.

These days, WiFi microcontrollers have been miniaturized, notably for mobile telephones and laptop computers and these new technologies are useful for aeronautical applications inasmuch as the weight and size are important factors in systems integration.

The present invention allows all the areas that need to be monitored to be equipped with autonomous and miniature remote locking devices.

These areas are, in particular, the doors of the rest areas, the doors of the toilets, and the doors of the luggage doors in particular.

During phases in which the aircraft is in use, flight, taxiing, boarding of passengers, the locks are not powered and therefore all the areas are freely accessible.

After the last flight prior to the craft being not in use for a lengthy period of time, which for short- or medium-haul is the last flight of the day and for long-haul is the long stop-over or period of non-use, the crew makes a tour of the airplane to check that no luggage has been left in the at-risk areas, then engages the LOCK function. The lock command is then transmitted by WiFi to all the miniature autonomous remote locks which, via their microcontrollers, lock all the accesses to which they are fitted. The airplane is now secure.

When use is resumed, for example in the morning for short- or medium-haul, as the crew enters the airplane, it checks on the WCC that there are no fault messages or forced entry messages and unlocks the areas by releasing the LOCK button: the WCC then sends the unlock message to all the autonomous locks over the WiFi network.

The system is thus managed by the cabin crew which no longer has systematically to inspect the areas covered by the invention when use of the aircraft is resumed.

FIG. 3 depicts one example of the equipping of the areas of FIG. 1 with remote locking devices 6 of the invention.

The cabin computer 12 is advantageously located in an avionic rack and its control and display panel located at the chief flight attendant's place or the pilot's seat.

The invention thus makes it possible to replace the security sweep by a check on a computer or a monitor screen.

In this context, the computer may be equipped with non-erasable means of logging the times at which the LOCK/UNLOCK commands have been issued so that the crew can check that no command to open has been issued during periods when the airplane was not in use and which could be the consequence of a hostile intrusion.

The invention claimed is:

1. A method of monitoring an aircraft, comprising:
checking security of a plurality of spaces within the aircraft and closing doors or hatches providing access to the plurality of spaces prior to a period of non-use of the aircraft, the period of non-use being a period when no passengers are on board the aircraft;
locking the doors or the hatches, after checking security prior to the period of non-use of the aircraft, via a monitoring and locking system having a central locking and unlocking control device, the central locking and unlocking device including a central control computer that operates remote locks equipped with a radio frequency emitter and receiver device to lock and unlock the doors or the hatches which are provided with a radio frequency control device connected to the radio frequency emitter and receiver device of the central control computer;

checking, via the monitoring and locking system, prior to a period of use of the aircraft, a status of the locks to the doors or hatches providing access to the plurality of spaces to determine whether at least one lock of the locks has experienced forced entry during the period of non-use;

performing, before the period of use of the aircraft, a security check only of at least a space sealed by a door or a hatch equipped with the at least one lock of the locks when the at least one lock has been determined via the monitoring and locking system to have experienced forced entry during the period of non-use; and determining via the monitoring and locking system that a security check does not need to be performed in the plurality of spaces before the period of use when the monitoring and locking system determines that none of the locks have experienced forced entry during the period of non-use.

2. The method of monitoring an aircraft as claimed in claim 1, further comprising unlocking the locks via the central control computer once the status of the locks has been checked.

3. The method of monitoring an aircraft as claimed in claim 1, wherein the remote locks include a magnetic lock and an electromagnetic control device, the magnetic lock being locked via an electronic switch of the electromagnetic control device.

4. The method of monitoring an aircraft as claimed in claim 1, wherein a connection between the central locking and unlocking control device and the remote locks is via a WiFi connection, the remote locks being locked via the WiFi connection.

5. The method of monitoring an aircraft as claimed in claim 1, wherein the central control computer is a cabin computer and the remote locks are locked via the cabin computer.

6. The method of monitoring an aircraft as claimed in claim 1, further comprising:

transmitting an error message when the remote locks detect a fault or forced entry;

receiving, decoding, and displaying the error message with the central control computer; and checking the status of the locks via the monitoring and locking system.

7. The method of monitoring an aircraft as claimed in claim 1, wherein the central computer controls all of the remote locks to lock or unlock simultaneously.

8. The method of monitoring an aircraft as claimed in claim 2, further comprising controlling by the central computer all of the remote locks to unlock simultaneously.

9. The method of monitoring an aircraft as claimed in claim 1, further comprising powering the remote locks via a battery cell.

10. The method of monitoring an aircraft as claimed in claim 1, further comprising powering the remote locks via an autonomous power supply separate from an electrical power supply connection of the aircraft.

11. The method of monitoring an aircraft as claimed in claim 5, further comprising locating the cabin computer on an avionic rack and connecting the cabin computer to a control and display panel located at a chief flight attendant station or at a pilot seat.

12. The method of monitoring an aircraft as claimed in claim 1, wherein the period of non-use of the aircraft begins after a last crew member leaves the airplane and ends when a subsequent first crew member enters the airplane.

13. The method of monitoring an aircraft as claimed in claim 1, further comprising powering the remote locks via an autonomous power supply, separate from an airplane electricity generation facility, during the period of non-use of the aircraft, wherein the autonomous power supply is recharged by the airplane electricity generation facility, and wherein the airplane electricity generation facility is not operational during the period of non-use of the aircraft.

14. The method of monitoring an aircraft as claimed in claim 1, wherein the period of use of the aircraft begins as a crew boards the aircraft.

15. The method of monitoring an aircraft as claimed in claim 1, wherein the period of use includes flight, taxiing, or boarding of passengers.

16. The method of monitoring an aircraft as claimed in claim 15, wherein the central computer controls all the locks to remain unlocked during the period of use.

17. The method of monitoring an aircraft as claimed in claim 1, wherein the central computer controls all the locks to remain unlocked during the period of use.

* * * * *